United States Patent [19]

Pawlosky

[11] Patent Number: 4,711,142
[45] Date of Patent: Dec. 8, 1987

[54] SAW SHARPENING APPARATUS

[76] Inventor: Anthony J. Pawlosky, R.D. #1, Hickory, Pa. 15340

[21] Appl. No.: 5,789

[22] Filed: Jan. 22, 1987

Related U.S. Application Data

[63] Continuation-in-part of Ser. No. 855,721, Apr. 25, 1986, abandoned.

[51] Int. Cl.⁴ ............................................. B23D 63/14
[52] U.S. Cl. ............................................. 76/37; 51/375
[58] Field of Search ................... 76/37, 45, 48, 50, 44; 51/246, 247, 375

[56] References Cited

U.S. PATENT DOCUMENTS

| | | | |
|---|---|---|---|
| 19,265 | 2/1858 | Stone et al. | 76/44 |
| 160,395 | 3/1875 | Cordesman | 76/44 |
| 220,574 | 10/1879 | Cass et al. | 76/44 |
| 312,935 | 2/1885 | Nostrand | 76/44 |
| 496,948 | 5/1893 | McKinnon | 76/44 |
| 1,111,191 | 9/1914 | Steckel | 76/37 |
| 1,488,056 | 3/1924 | Orr | 76/37 |
| 1,620,165 | 3/1927 | Orr | 76/40 |
| 1,771,602 | 7/1930 | Armstrong et al. | 76/41 |
| 1,803,934 | 5/1931 | East | 76/37 |
| 2,076,916 | 4/1937 | Perkins | 76/41 |
| 2,249,743 | 7/1941 | Bucknam | 76/37 |
| 2,439,279 | 4/1948 | Andrus | 76/37 |
| 2,651,219 | 9/1953 | Tower et al. | 76/37 |
| 2,734,321 | 2/1956 | Field | 51/190 |
| 2,800,750 | 7/1957 | Field | 51/190 |
| 2,894,418 | 7/1959 | Jackson | 76/37 |
| 3,880,019 | 4/1979 | Young | 76/37 |

Primary Examiner—Roscoe V. Parker

[57] ABSTRACT

A hand-held, motor driven apparatus for sharpening saw blades wherein a small grinding drum having its axis transverse to the saw blade provides a hollow ground sharpening action and the body of the apparatus extends over each side of the grinding drum to shield each side of the grinding site to thereby provide optimum safety for the operator.

9 Claims, 4 Drawing Figures

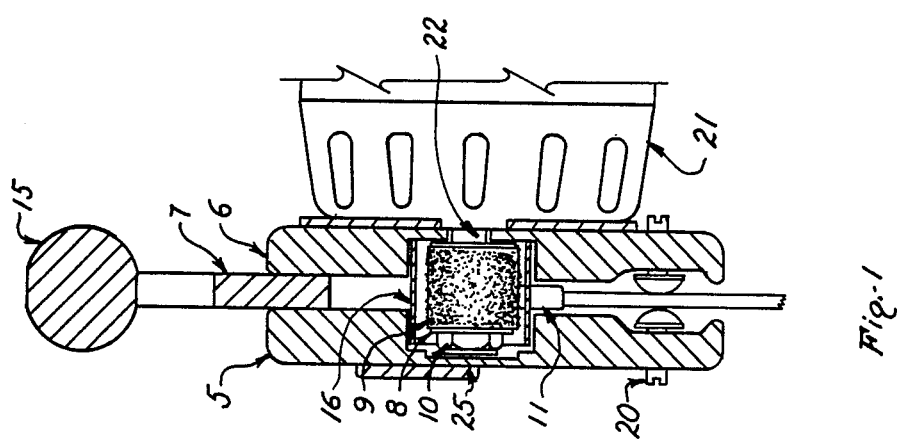

SAW SHARPENING APPARATUS

This application is a Continuation-in-Part of application Ser. No. 06/855,721, filed Apr. 25, 1986, now abandoned.

BACKGROUND OF THE INVENTION

This invention relates to a hand-held, motor driven apparatus for sharpening saw blades, particularly large circular saw blades having replaceable teeth as used in commercial lumber cutting operations. While similar saw blade sharpeners can be found in the prior art, there have been no significant advances therein in 40 years. U.S. Pat. Nos. 2,249,743; 2,439,279; 2,651,219 and 3,880,019 each relate to hand-held, motor driven saw blade sharpeners. Of these sharpeners, the one disclosed in U.S. Pat. No. 2,249,743 is the only one which is readily available and commonly used in the industry today. While this saw blade sharpener will perform the job intended, there are several disadvantages with this apparatus as well as the others disclosed in the prior art. For example, all these sharpeners utilize solid grinding wheels, which require frequent dressing and are costly to replace. It is also known that solid grinding wheels will fracture in use on some occasions creating a significant hazard due to the flying grinding wheel pieces. In addition, it can be seen from the disclosures in the above cited patents that none are provided with any means for shielding the operator from the sparks and particles emitted from manual grinding operations, let alone from fractured grinding wheel fragments.

It can further be seen that most of the sharpeners disclosed in the above-cited patents utilize flat grinding surfaces that grind the saw blade tooth in a direction transverse to the cutting direction of the saw tooth. On the other hand, the sharpening apparatus as described below provides a much preferred hollow ground sharpening action as described in U.S. Pat. No. 2,651,219. It is well known that a hollow ground sharpening action, which provides a concave grind perpendicularly away from the saw tooth cutting edge, is far superior. This is so not only because the sharpened tooth need not be dressed to remove burrs and wire edges, but also because the so sharpened saw blade itself is superior not only in providing a better cut, but less energy is required to make a comparable cut. In addition, the hollow ground sharpening action can be effected at a higher RPM having less tendency to burn the saw tooth metal.

In addition to the above there are other disadvantages in the prior art sharpeners as will become apparent when contrasted to the saw blade sharpener of this invention as described below.

SUMMARY OF THE INVENTION

This invention relates to a new and improved hand-held, motor driven apparatus for sharpening saw blades which overcomes the hazards and disadvantages of prior art sharpeners. Accordingly, an object of this invention is to provide a saw-blade sharpening apparatus which is not only safer to operate, but is also simpler to operate. In addition the sharpener of this invention provides a desirable hollow ground sharpening action, utilizes an inexpensive grinding sleeve which never needs dressing, is of simple design and low cost fabrication, and is readily adjustable to be utilized on saw blades of differing size and design.

BRIEF DESCRIPTION OF THE DRAWINGS

FIG. 1 is a cross-sectional end view of a saw sharpening apparatus according to this invention properly positioned on a circular saw blade.

DESCRIPTION OF THE INVENTION

Figure 3:
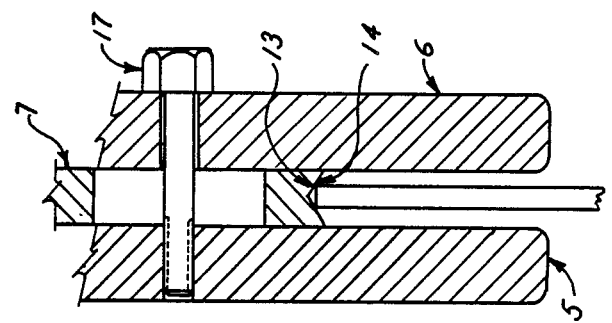
FIG. 3 is a fragmentary, cross-sectional end view of the apparatus shown in FIG. 1 illustrating a locating guide which serves to properly position and center the apparatus over the saw blade for proper sharpening.

In essence, the broadest aspect of this invention comprises a body member having a slotted opening partially therethrough such that the body member will straddle a saw blade in a saddle back manner, and having a motor attached thereto which rotates a grinding drum located entirely within the slotted opening with its axis transverse to the opening. Referring to the drawings, the preferred embodiment of this invention as illustrated comprises two similar side plates 5 and 6 adjustably secured to a center plate 7 by bolts 17, such that plates 5 and 6 extend beyond one edge of plate 12 and such that the slotted opening is formed between end plates 5 and 6. The holes in center plate 7 through which bolts 17 pass are vertically elongated so that center plate 7 can be adjusted upward or downward with respect to end plates 5 and 6. Side plate 6 has a small motor 21 attached thereto such that the motor shaft 22 extends transversely through side plate 6 and into the space provided between plates 5 and 6. A cylindrical grinding drum is axially secured over the motor shaft 22 and is contained entirely within the opening between plates 5 and 6 such that said plates 5 and 6 provide a shield on each side of the grinding drum.

Figure 2:
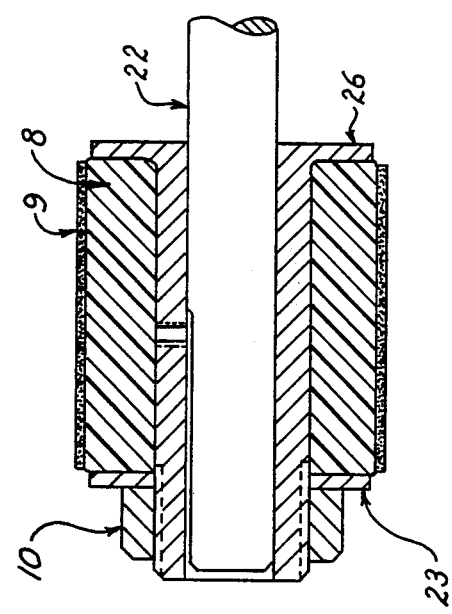
FIG. 2 is a fragmentary cross-sectional illustration of the preferred method of securing grinding sleeve to the motor arbor.

A preferred embodiment of the grinding drum is illustrated in FIG. 2 and consists of an expandable rubber drum 8 which is snugly fitted over arbor 26. Arbor 26 is axially keyed to the motor shaft 22, and an abrasive sleeve 9 snugly fitted over rubber drum 8. The end of the arbor 26 is threaded to receive nut 10 which can be tightened against washer 23 and rubber drum 8 causing rubber drum 8 to expand radially against, and thus tightly secure, abrading sleeve 9.

The upper edge of center plate 7 is provided with a handle 15 to facilitate handling of the sharpener while the lower edge thereof, which is covered by plates 5 and 6, is provided with extended portions on each side of the grinding drum which function as locating guides 12 which will rest on the saw blade to limit the extent to which the apparatus can be lowered over the saw blade so that the grinding drum will be properly positioned with respect to the saw tooth to be sharpened. By loosening bolts 17, the position of center plate 7 can be moved with respect to end plates 5 and 6 and thus the grinding drum to thereby properly adjust locating guides 12 to saw blades of differing sizes and configurations. The locating guides 12 are each provided with a V groove 14 in the lower surface so that the sharpener can be centered over the saw blade as illustrated in FIG. 3.

A drum guard 16 is secured between side plates 5 and 6 which partially encircling the grinding drum on the lower and forward side thereof. The functions of the drum guard 16 is two-fold; first it protects the grinding drum from contacting any surface of the saw blade other than the tooth to be sharpened where sharpening is necessary, thereby eliminating any damage to the saw blade 13; and second, to permit the operator to advance the sharpener from one tooth to the next without needing to turn off the sharpener motor 21.

Each of side plates 5 and 6 have two centering studs 20 that can be adjusted inwardly to the saw blade 13. If all four studs 20 are adjusted equally against a saw blade they will center the sharpener squarely over saw blade 13 for proper alignment.

Figure 4:
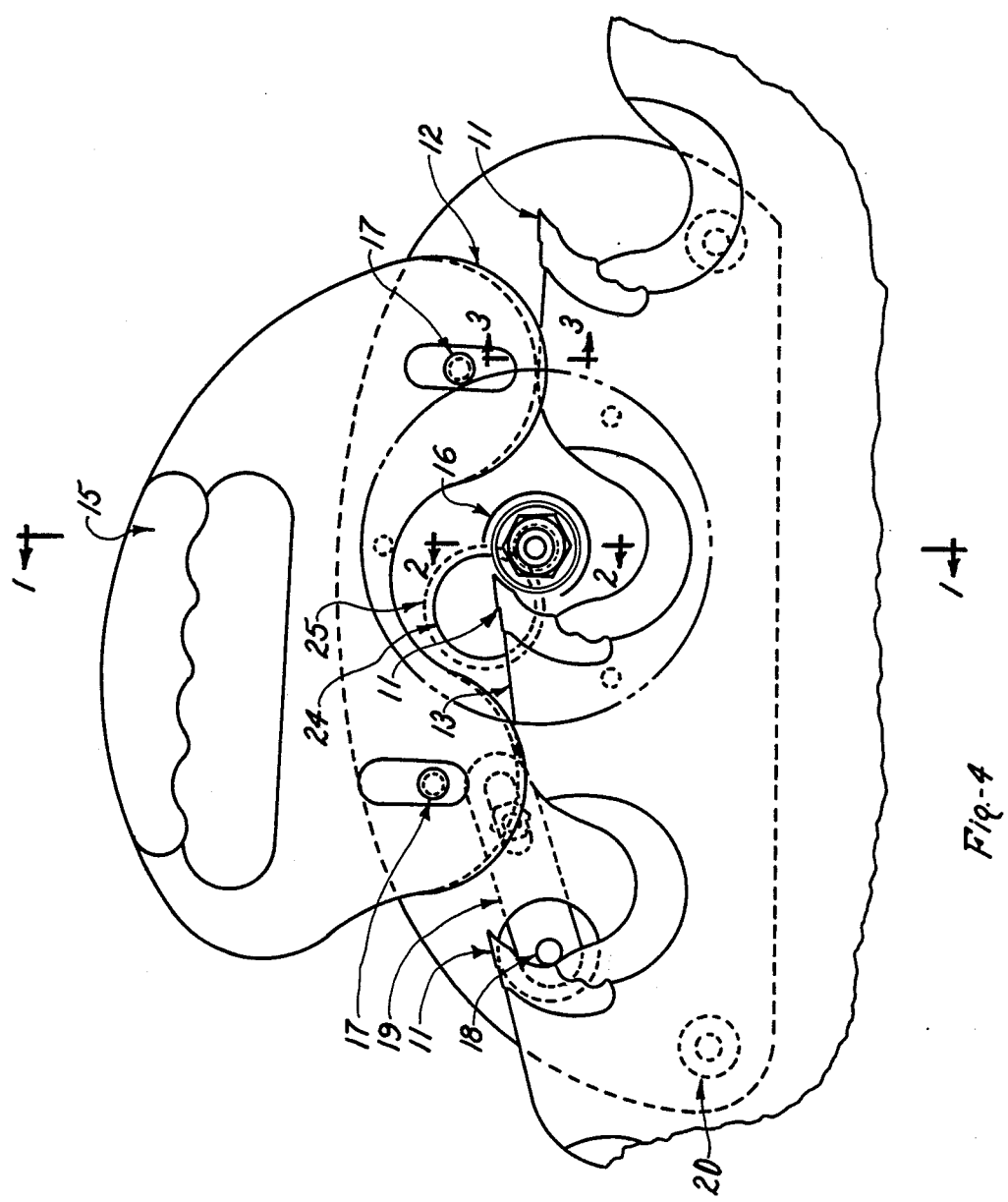
FIG. 4 is a side view of the apparatus shown in FIG. 1 properly positioned over a circular saw blade.

As shown in FIG. 4 a stop set adjustment assembly is adjustably attached to side plate 6. This assembly consists merely of a cylindrical pin 18 attached to a pivotally and slidably adjustable bar 19 such that pin 18 partially transverses the space between the side plates 5 and 6, and which can be adjusted to engage the first saw tooth behind the saw tooth being sharpened. This enables the operator to uniformly control the amount of sharpening on each tooth, thus assuring greater accuracy and uniformity during the sharpening process.

The lower portions of side plates 5 and 6 extend sufficiently below the grinding drum to function as side shields covering the grinding site to protect the operator from sparks and flying particles emitted by the grinding action. In order to facilitate adjustment, a hole or opening 24 is provided through the side of side plate 5 exposing that area where the grinding drum contacts the saw tooth. Then during operation a plastic cover 25 can be secured over or snapped into the opening to protect the operator. Ideally, cover 25 should be made of a transparent plastic so that it need not be removed to view the grounding area.

While the sharpening apparatus as described above properly adjusted, its use is such a simple procedure that there is no need for the operator to be skilled. The operator must merely lower the sharpener over the saw blade 13 as shown in the drawings until the locating guides rest on the saw blade. The weight of the sharpener will automatically cause the upper part of the saw blade to be centered in the v-grooves 14 in the end of the locating guides 12, while studs 20 will center the saw blade therebelow so that the sharpener is centered and squared on the saw blade 13. With the power turned on and the grinding drum positioned in front of the saw tooth 11 to be sharpened as shown, the operator merely need to pull the sharpener to the rear so the grinding drum engages to the saw tooth effecting a good hollow ground sharpening action. When pin 18 comes into contact with the saw tooth therebehind, the sharpener cannot be pulled to the rear any further and the tooth 11 is properly sharpened. To sharpen the next saw tooth, the operator should then push the sharpener forward until the grinding drum drops in front of the next tooth. Drum guard 16 will permit this to be done without permitting the grinding drum to contact and damage any portion of the saw blade. The procedure must then be repeated. During the entire operation the operator is of course protected by side plates 5 and 6.

It is well known that continual use of a solid grinding wheel in the prior art sharpeners will cause the wheel's grinding surface to be worn leaving a grooved or irregular surface. As a result, such grinding wheels must frequently be properly rejoined or dressed to restore the necessary grinding surface flatness. After numerous dressings it is of course necessary to replace an excessively worn grinding wheel with a new one. Most prior art sharpeners will have to be readjusted each time the grinding wheel is removed for dressing or replacement. The abrasive sleeve 16 as disclosed above provides a significant advantage in that it maintains its cylindrical configuration and indeed cannot be dressed. The grinding sleeve 16, I have utilized consists of a small, heavy-paper tube having an abrasive grit bonded to its outer surface. As such, the abrasive sleeve 16 is very inexpensive. Accordingly, it is quicker and less costly to merely replace a worn sleeve 16 with a new one than it is to dress a solid grinding wheel. In addition to being less costly, the grinding sleeve 16 of this invention has a double life. As can be seen by reference to FIG. 4, the grinding sleeve 16 engages the saw tooth closer to its outer edge. When the outer edge is so worn that replacement is necessary, the operator can merely turn grinding sleeve 16 around on rubber drum 8 so the unworn inner surface becomes outer surface, thereby doubling the life of each abrasive sleeve 16. In addition to the above advantages, the motor and grinding sleeve of this inventive sharpening apparatus can easily and quickly be removed and replaced without interfering with any of the sharpener's adjustments. This can be done quickly merely by detaching motor 21 from side plate 6 which does not affect any adjustments on the sharpener.

I claim:

1. A hand-held, motor driven apparatus for sharpening saw blades consisting of a body member having a slotted opening partially therethrough such that said body member will straddle a saw blade to be sharpened in a saddle back manner to provide a side shield on each side of said saw blade adjacent to the tooth on said saw blade being sharpened, a motor attached to said body member such that the shaft on the motor extends transversely into the slotted opening, and a cylindrical grinding drum secured over the motor shaft as will provide a hollow ground sharpening action on the teeth of the saw blade being sharpened.

2. An apparatus according to claim 1 wherein said body member consists of two side plates adjustably bolted to a center plate such that the side plates extend beyond one edge of said center plate to form the slotted opening and side shields.

3. An apparatus according to claim 1 in which said cylindrical grinding drum consists of an expandable rubber drum axially secured over the motor shaft and a tight fitting cylindrical abrasive sleeve fitted over the rubber drum.

4. An apparatus according to claim 1 in which a locating guide is provided on each side of the cylindrical grinding drum which serves to adjustably limit the extent to which the body member can be lowered in saddle back manner over a saw blade.

5. An apparatus according to claim 4 in which each locating guide has a v-groove which contacts the saw blade to center the saw blade edge within the slotted opening.

6. An apparatus according to claim 1 having a grinding drum guard secured within said slotted opening consisting of a partial sleeve partially encircling said grinding drum on the forward and lower side such that the apparatus can be advanced over the saw blade being sharpened from one tooth to the next without the grinding drum coming into contact with any portion of the saw blade.

7. An apparatus according to claim 1 having a pin adjustably secured transversely within said slotted opening such that it can be adjusted to engage a saw tooth next to the saw tooth being sharpened to thereby limit the extent to which the grinding drum can grind the saw tooth being sharpened.

8. An apparatus according to claim 2 in which the edge of said center plate covered by the side plates extends downward on each side of the grinding drum to form locating guides which will rest against the saw blade to be sharpened thereby limiting the extent to which the apparatus can be lowered in saddle back over the saw blade.

9. An apparatus according to claim 8 in which the edges of said locating guides which rest against the saw blade are each provided with a v-groove which serve to center the saw blade between the two side plates.

* * * * *